United States Patent
Gasperino

[11] Patent Number: 6,135,516
[45] Date of Patent: Oct. 24, 2000

[54] MAGNETIC DOORSTOPS AND HANDTRUCK HOLSTERS

[76] Inventor: Joseph A. Gasperino, 1620 Yates Dr., Merritt Island, Fla. 32952

[21] Appl. No.: 09/338,203

[22] Filed: Jun. 22, 1999

Related U.S. Application Data

[63] Continuation-in-part of application No. 08/871,796, Jun. 6, 1997, Pat. No. 5,938,215, which is a continuation-in-part of application No. 08/721,257, Sep. 26, 1996, Pat. No. 5,769,437, which is a continuation-in-part of application No. 08/661,162, Jun. 10, 1996, abandoned.

[51] Int. Cl.$^7$ .................................................. B62B 1/00
[52] U.S. Cl. .................. 292/343; 280/47.27; 280/47.19; 224/277; 292/251.5
[58] Field of Search ................................. 292/251.5, 343, 292/339, DIG. 15; 280/47.27, 47.28, 47.19; 224/277, 411; 248/225.11

[56] References Cited

U.S. PATENT DOCUMENTS

| | | |
|---|---|---|
| D. 221,131 | 7/1971 | Germock .................................... D8/204 |
| D. 242,985 | 1/1977 | Sasgen ........................................ D8/7 |
| D. 253,335 | 11/1979 | Gauntner et al. .................... 292/251.5 |
| D. 309,708 | 8/1990 | Rosa et al. ............................... D8/402 |
| D. 344,014 | 2/1994 | Marshall .................................. D8/402 |
| 423,343 | 3/1890 | Renshaw . |
| 521,037 | 6/1894 | McCombs ................................ 292/343 |
| 652,659 | 6/1900 | Blackwell . |
| 693,740 | 2/1902 | Raether . |
| 1,042,329 | 10/1912 | Daniels . |
| 1,181,056 | 4/1916 | Arnt . |
| 1,354,046 | 9/1920 | Lanning . |
| 1,555,129 | 9/1925 | Lipsius ..................................... 292/343 |
| 1,730,676 | 10/1929 | Miller .................................... 280/47.27 |
| 2,131,673 | 9/1938 | Robinson .................................. 280/53 |
| 2,577,579 | 12/1951 | Hall ......................................... 224/411 |
| 3,494,631 | 2/1970 | Kreider ................................. 280/47.19 |
| 3,636,727 | 1/1972 | Waughton ............................ 292/251.5 |
| 3,674,191 | 7/1972 | Goings .................................. 224/29 R |
| 3,762,739 | 10/1973 | Tabet . |
| 3,804,432 | 4/1974 | Lehrman .................................. 280/36 |
| 4,274,567 | 6/1981 | Sawyer .................................. 224/42.43 |
| 4,501,444 | 2/1985 | Dominguez ............................ 292/342 |
| 4,743,050 | 5/1988 | Small ........................................ 281/45 |
| 4,797,970 | 1/1989 | Charlton .................................... 16/82 |
| 4,925,223 | 5/1990 | Craft ....................................... 292/339 |
| 4,958,869 | 9/1990 | Bisher .................................... 292/339 |
| 4,976,479 | 12/1990 | Lunn ...................................... 292/343 |
| 5,044,681 | 9/1991 | Neighbors ............................. 292/288 |
| 5,072,957 | 12/1991 | Graebe, Jr. ......................... 280/33.992 |
| 5,123,666 | 6/1992 | Moore ................................. 280/47.28 |
| 5,159,777 | 11/1992 | Gonzalez ................................ 43/54.1 |
| 5,176,392 | 1/1993 | Graebe, Jr. ......................... 280/33.992 |
| 5,244,221 | 9/1993 | Ward ..................................... 280/79.7 |
| 5,340,136 | 8/1994 | MacNeil et al. . |

(List continued on next page.)

FOREIGN PATENT DOCUMENTS

| | | |
|---|---|---|
| 1324030 | 3/1963 | France ................................ 280/47.27 |
| 732276 | 2/1953 | United Kingdom ................ 280/47.19 |

*Primary Examiner*—Darnell Boucher
*Attorney, Agent, or Firm*—Brian S. Steinberger; Law Offices of Brian S. Steinberger

[57] ABSTRACT

A metal holster for allowing a magnetic doorstop to be held in place so that the holster can be attached to handtrucks. The magnetic doorstop can be triangular wedge shaped with at least one exterior side portion having a magnetic surface. The holsters can be made from aluminum and have a metal portion inside for attracting the magnetic doorstop, or the holster can be completely made from a magnetically attractable metal. The holster can be rectangular box with an opening in one side, and a string bent tab inside for further keeping the doorstop within the box. The box can include a ledge portion such as a pin across the opening. An expandable clip allows the holster/box to be attached side legs and members of the handtruck. Another embodiment takes advantage of a pre-existing side leg and cross-member cavity in the handtruck. The magnetic doorstop can be sized to fit within the cavity and be attracted to the metal of the handtruck itself, or a metal strip can be attached to the side leg of an aluminum handtruck for attracting the magnetic doorstop. Additional features such as a ledge pin, and/or spring tab inside the cavity can further support the doorstop.

8 Claims, 4 Drawing Sheets

U.S. PATENT DOCUMENTS

| | | | |
|---|---|---|---|
| 5,415,420 | 5/1995 | Koeller | 280/47.28 |
| 5,426,959 | 6/1995 | Kies | 70/56 |
| 5,447,347 | 9/1995 | Siddons | 292/342 |
| 5,449,209 | 9/1995 | Breit | 292/258 |
| 5,464,104 | 11/1995 | McArthur | 211/113 |
| 5,480,078 | 1/1996 | Verrette et al. | 224/274 |
| 5,601,320 | 2/1997 | Miller | 292/343 |
| 5,660,403 | 8/1997 | O'Neill | 280/47.19 |
| 5,769,437 | 6/1998 | Gasperino | 280/47.27 |
| 5,771,533 | 6/1998 | Kuang-Pin | 16/82 |
| 5,993,134 | 11/1999 | Williamson . | |

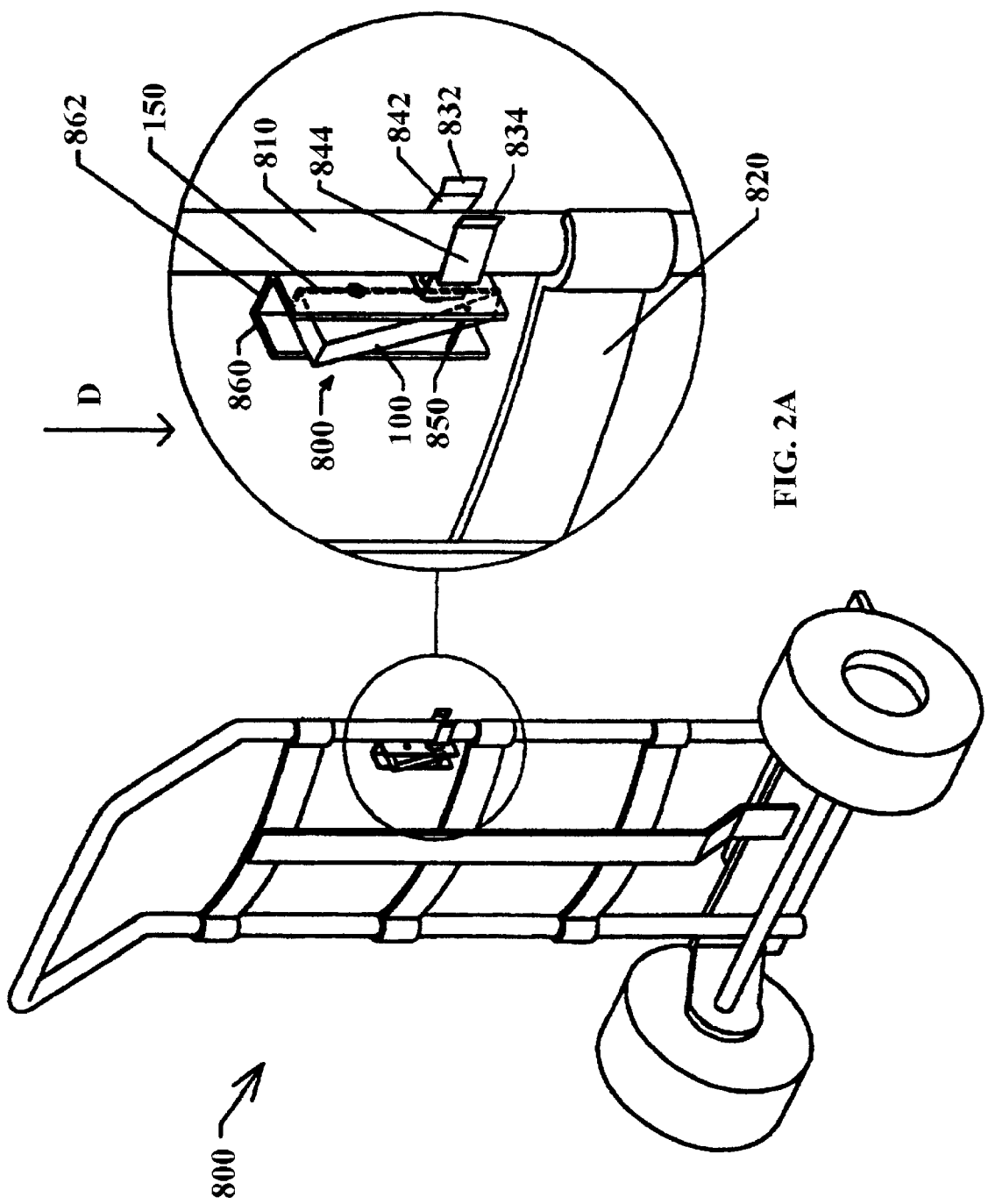

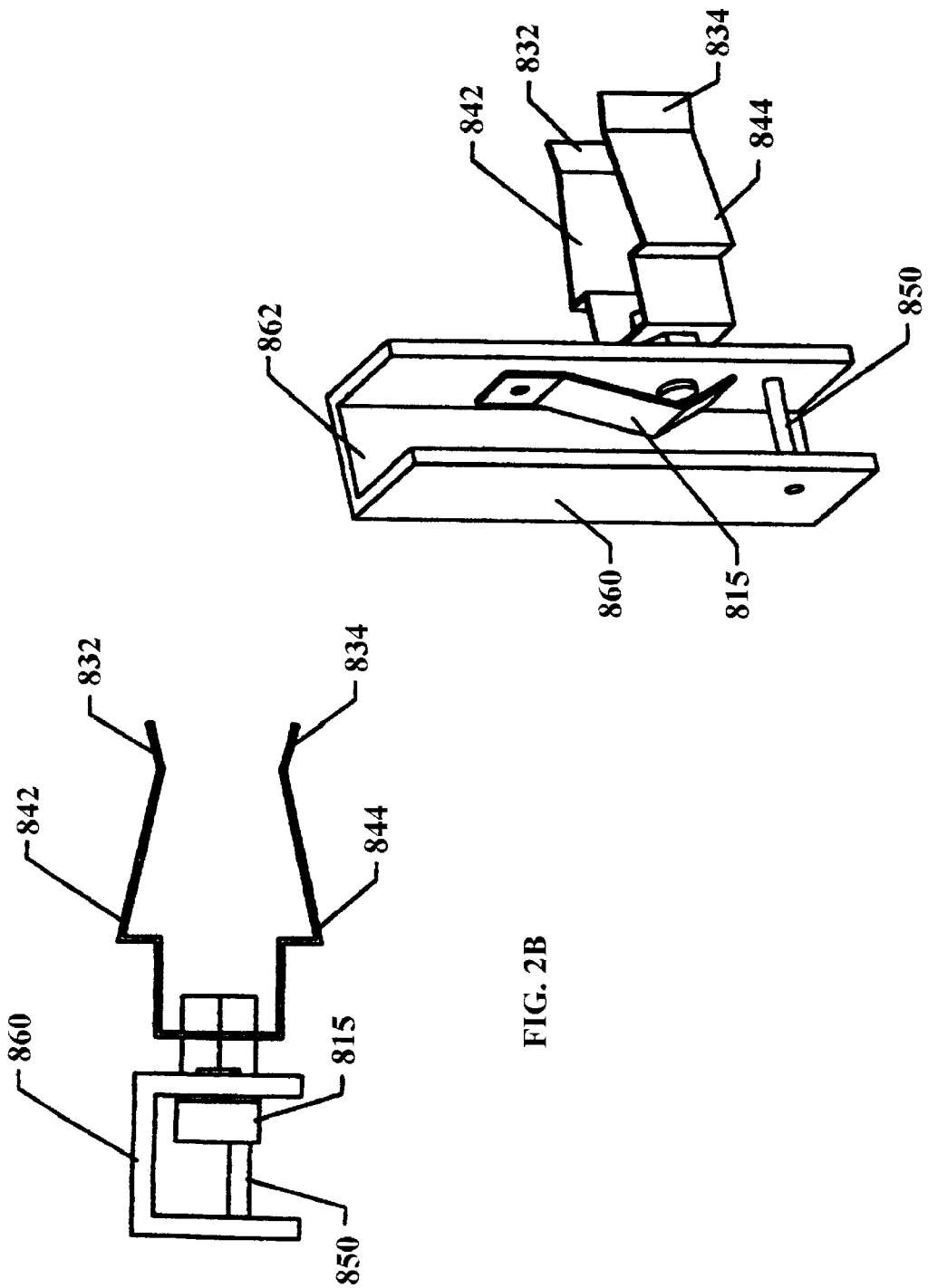

MAGNETIC DOORSTOPS AND HANDTRUCK HOLSTERS

This invention relates to door stops, and in particular to magnetic doorstops and holsters for holding the doorstops on hand trucks, is a Continuation-In-Part of U.S. Application Ser. No. 08/871,796 filed on Jun. 6, 1997, now U.S. Pat. No. 5,938,215 which is a Continuation-In-Part of U.S. Ser. No. 08/721,257 filed Sep. 26, 1996, which issued as U.S. Pat. No. 5,769,437 on Jun. 23, 1998, which is a Continuation-In-Part of U.S. Ser. No. 08/661,162 Filed on Jun. 10, 1996, now abandoned.

BACKGROUND AND PRIOR ART

Servicemen and delivery men using handtrucks often have to prop open doors when making service calls and deliveries. The propping open of doors is further exacerbated when the doors are spring loaded. Valuable time and/or labor is wasted trying to find something or someone to hold open the doors.

Traditional devices for propping open doors have been wedges usually formed from wood or rubber. See for example: U.S. Pat. No. Des.309,708 to Rosa et al, and U.S. Pat. Nos.: Des. 221,131 to Germock, Jr.; Des. 242,985 to Sasgen; Des. 344,014 to Marshall; 693,740 to Raether; 1,181,056 to Arnt; 4,958,869 to Bisher; and 4,976,479 to Lunn. However, many of these doorstops include shapes other than wedges, such as bent wire shapes, oblong and strange configurations that can be both difficult and expensive to manufacture.

Many of these alternative door stops whether being wedge shaped or oblong shaped also have sharp edges/ends that could damage floors. Storing these door stops in the pockets of clothing is not much of an option since the sharp edges can rip one's pockets.

Furthermore, none of these prior art devices describes any teaching for storing the door stops on handtrucks, leaving the driver to have to still physically carry the door stops.

Additionally, it comes as no surprise that many door stops that are used become lost, misplaced and often forgotten and left on job sites.

Thus, the need exists for a solution to above problems.

SUMMARY OF THE INVENTION

The first objective of the present invention is to provide a magnetic door stop.

The second objective of the present invention is to provide a detachable holster for storing a magnetic door stop that can be attached to a hand truck.

The third object of this invention is to provide a mounting arrangement for storing a magnetic door stop on a handtruck.

The subject inventor is the inventor of U.S. Pat. 5,769,437 for "Handtruck Holsters For Door Stops and Clipboards" which is incorporated by reference.

Further objects and advantages of this invention will be apparent from the following detailed description of a presently preferred embodiment which is illustrated schematically in the accompanying drawings.

BRIEF DESCRIPTION OF THE FIGURES

FIG. 2A is a perspective view of a single door stop holster embodiment for FIGS. 1A–1B using a pin ledge portion and a clip that attaches the holster to a handtruck.

FIG. 2B is a top view of the holster of FIG. 2A without a door stop not attached to a handtruck.

FIG. 2C is a separate perspective view of the holster of FIG. 2B.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1B:
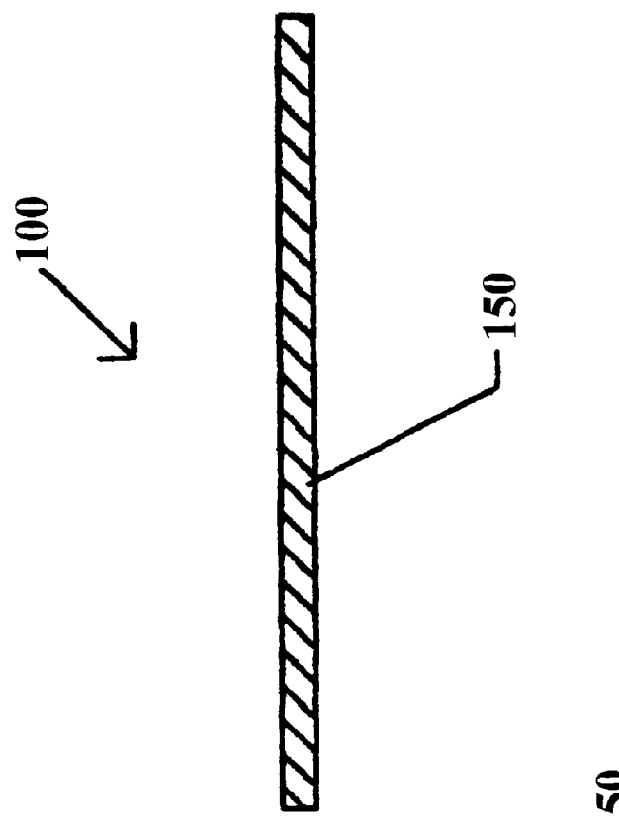
FIG. 1B is a bottom view of the magnetic door stop of FIG. 1A along arrow A.
Figure 1A:
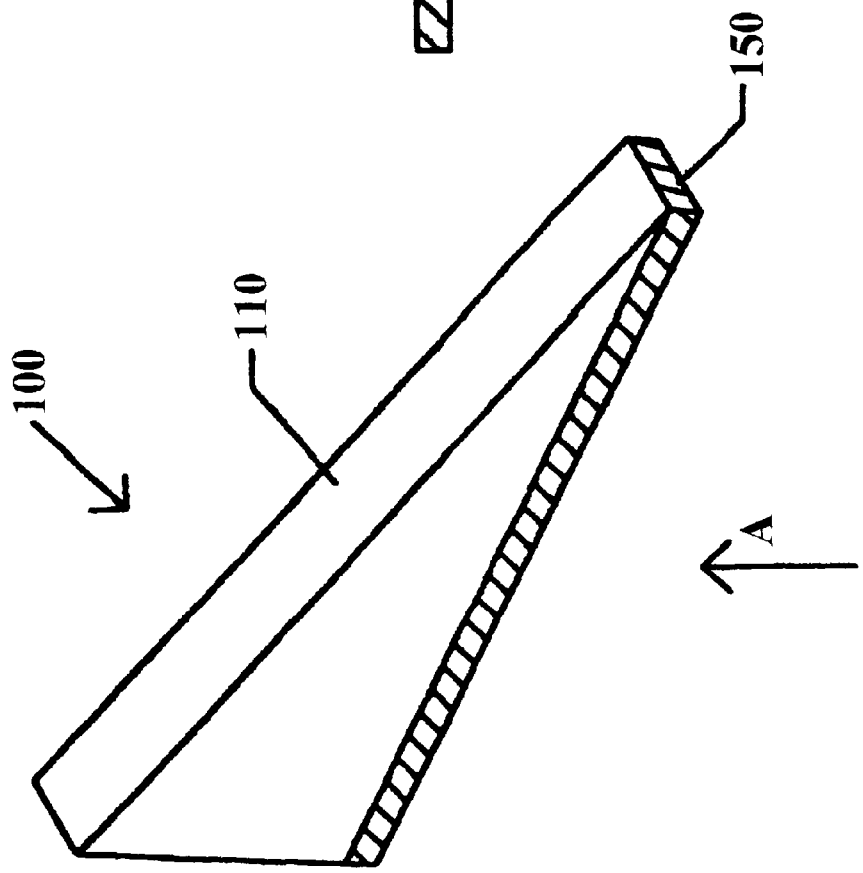
FIG. 1A is a perspective view of a novel magnetic door stop invention.

FIG. 1A is a perspective view of a novel magnetic door stop invention 100. FIG. 1B is a bottom view of the magnetic door stop 100 of FIG. 1A along arrow A. Wedge portion 110 can be triangular such as but not limited to a right angled shaped wedge, a forty-five degree angled shaped wedge, and the like. Wedge portion 110 can be formed from wood, plastic, composite, rubber, metal, aluminum, combinations thereof and the like. Attached to the base portion of wedge 110 is a magnetic strip 150 that can be attached thereof by glue, adhesive, and the like.

FIG. 2A is a perspective view of an embodiment 800 of the single metal door stop holster of using a pin 850 and clip 842, 844 for attaching the holster to a handtruck leg/bar 810. FIG. 2B is a top view of the holster embodiment 800 of FIG. 2A without a door stop not attached to a handtruck. FIG. 2C is a separate perspective view of the holster embodiment 800 of FIG. 2B. Referring to FIGS. 2A–2C, holster embodiment 800 includes dual opposing expandable clip sections 832, 834 and 842, 844 that supports rectangular casing 860 having an open top, open bottom and open front with a pin 850 across a lower portion for holding door stop 100 therein. The magnetic portion 150 of doorstop 100 can be attracted against the interior metal rear wall 862. An interior attached bent metal tab 815 functions as a compressible spring to hold the door stop 100 inside the box 860. Although, the holster 860 is shown attached to a longitudinal side leg 810, the holster 860 can also be attached to a bar shaped crossmember 820, and the like. Holster 860 can be made from metal such as but not limited to galvanized metal, stainless steel, and the like. Alternatively, holster 860 can be made from nonmagnetic materials such as but not limited to aluminum, plastic, and the like. If made from nonmagnetic materials, the rear inside wall 862 of holster 860 can have a metal strip attached or adhered inside in order to attract the magnetic doorstop 100.

Figure 3:
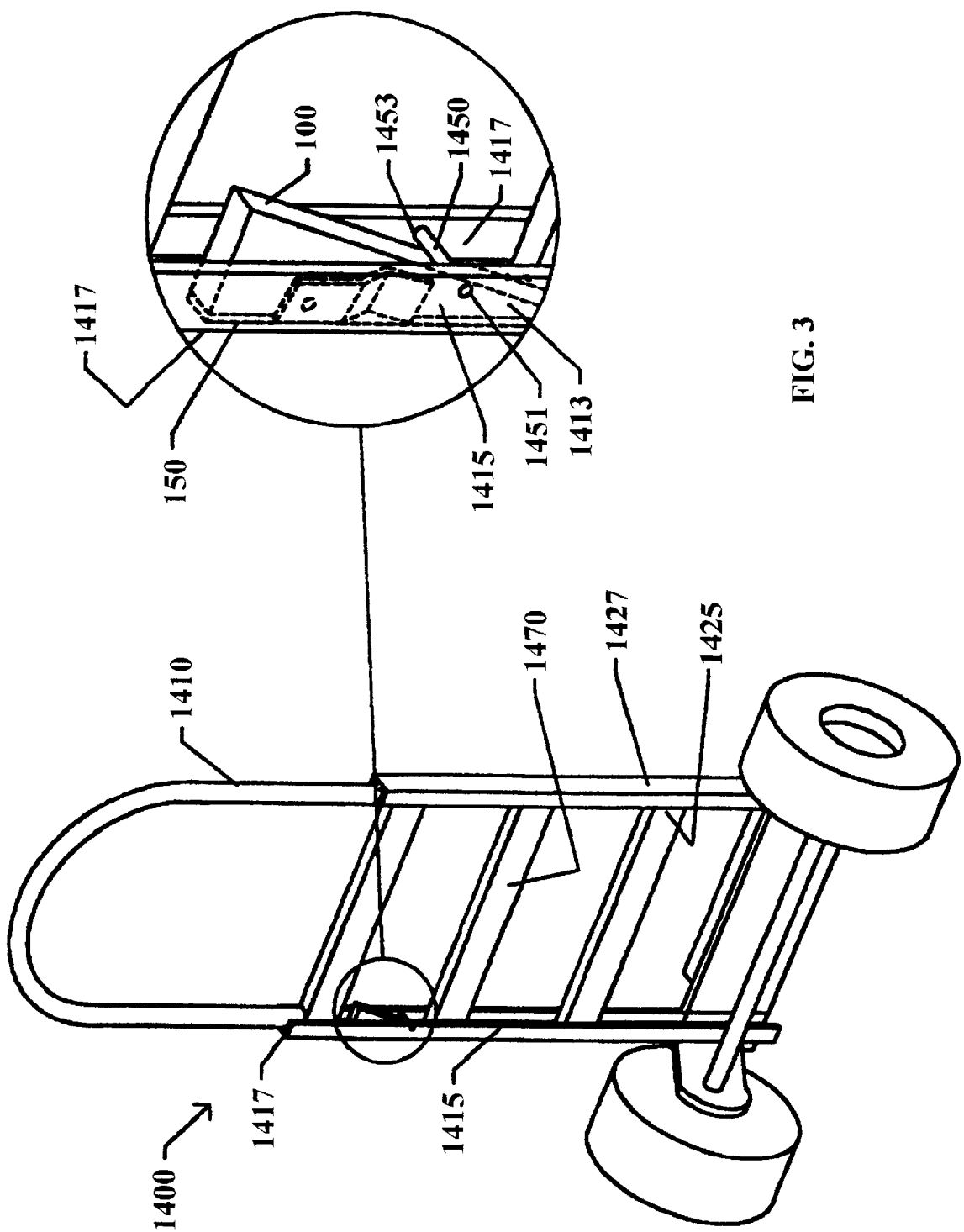
FIG. 3 is a perspective view of a doorstop holster built into the side leg frame of a handtruck.

FIG. 3 is a perspective view of a doorstop holster 1400 built into the side legs 1415, 1425 of a handtruck 1410. Handtruck 1410 has side legs 1415, 1425 having interior facing grooves/cavities therein, and respective inner rear walls 1417, 1427. Magnetic surface 150 of doorstop 100 is held in place by abutting up against interior metal surface 1417 of side leg 1415. Additionally, an interior bent metal tab spring 416(similar to 815 of FIG. 2C) can be attached to the interior surface of wall 1415 to abut to and further hold doorstop 100. Embodiment 1400 can also include a metal pin 1450 having ends 1451, 1453 that creates a ledge beam across the openings in the respective side legs 1415, 1425. For example ends 1451, 1453 of pin 1450 can be inserted into and fastened by welding and the like, to side walls 1413, 1417 of hollow side leg 1415. A doorstop 100 such as a those previously can be inserted and supported inside the interior grooved side legs 1415, 1425 by the pin 1450. Although a pin is shown for forming the ledge beam, other beams can be included such as but not limited to a rectangular plate beam, a square beam, a wire and the like, where the ends can be fastened by welds, screws, rivets and the like to the interior walls of the side legs 1415, 1425. Similar to the embodiment of FIGS. 2A–2C, if handtruck 1410 is formed from a nonmagnetic material such as aluminum, plastic and the like, the interior walls 1417, 1427 of side legs 1415, 1425 can include a metal strip adhered thereto, to attract and hold the magnetic doorstop 100. Furthermore, if handtruck 1410 has horizontal cross-members 1470 with grooves/cavities, then the magnetic doorstop 100 can be similarly attached thereto.

As previously described, the novel doorstops and novel holsters can be formed form various materials such as but not limited to aluminum, stainless steel, galvanized steel, molded plastic, fiberglass, rubber, and combinations thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A handtruck assembly, comprising in combination:
   a handtruck having an upper handgrip end, a lower end having wheels and a base for supporting a load, and longitudinal legs and side members connecting the upper handgrip end to the lower end;
   a cavity opening within at least one of the longitudinal legs having a first portion, the cavity opening having at least one of: a ledge beam across the cavity opening, and a spring member; and
   a doorstop having a second portion, wherein the door stop can be inserted inside the cavity opening and supported by at least one of the ledge beam and the spring member, and the first portion can be magnetically attracted to the second portion, while the handtruck is in transit.

2. The handtruck assembly of claim 1, wherein the ledge beam includes:
   a pin.

3. The handtruck assembly of claim 1, wherein the spring member includes:
   a spring tab attached inside of the cavity opening.

4. The handtruck assembly of claim 1, wherein the first portion and the second portion are selected from a metal portion and a magnetic portion.

5. A handtruck assembly, comprising in combination:
   a handtruck having an upper handgrip end, a lower end having wheels and a base for supporting a load, and longitudinal legs and side members connecting the upper handgrip end to the lower end;
   a holster having an opening and a first portion, the holster having at least one of: a ledge beam across the opening, and a spring member; and
   a doorstop having a second portion, wherein the door stop can be inserted inside the holster and supported by at least one of the ledge beam and the spring member, and the first portion can be magnetically attracted to the second portion, while the handtruck is in transit.

6. The handtruck assembly of claim 5, wherein the ledge beam includes:
   a pin.

7. The handtruck assembly of claim 5, wherein the spring member includes:
   a spring tab attached inside of the cavity opening.

8. The handtruck assembly of claim 5, wherein the first portion and the second portion are selected from a metal portion and a magnetic portion.

* * * * *